United States Patent
Bauer

(10) Patent No.: US 7,425,062 B2
(45) Date of Patent: Sep. 16, 2008

(54) INKJET INK, INK SET AND METHOD OF PRINTING

(75) Inventor: Richard Douglas Bauer, Kennett Square, PA (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 227 days.

(21) Appl. No.: 10/985,117

(22) Filed: Nov. 10, 2004

(65) Prior Publication Data

US 2006/0098066 A1    May 11, 2006

Related U.S. Application Data

(60) Provisional application No. 60/519,441, filed on Nov. 12, 2003.

(51) Int. Cl.
    *G01D 11/00*    (2006.01)
(52) U.S. Cl. .................... 347/100; 347/95; 523/160
(58) Field of Classification Search ............ 347/100, 347/95, 96, 101; 106/31.6, 31.13, 31.27; 523/160
    See application file for complete search history.

(56) References Cited

U.S. PATENT DOCUMENTS

| | | | |
|---|---|---|---|
| 4,487,964 A | 12/1984 | Watson, Jr. et al. | |
| 4,694,302 A | 9/1987 | Hackleman et al. | |
| 4,977,219 A | 12/1990 | Watson, Jr. | |
| 5,047,588 A | 9/1991 | Taylor | |
| 5,081,173 A | 1/1992 | Taylor | |
| 5,085,698 A | 2/1992 | Ma et al. | |
| 5,136,006 A | 8/1992 | Sundararaman et al. | |
| 5,231,131 A | 7/1993 | Chu et al. | |
| 5,258,481 A | 11/1993 | Hesselmans et al. | |
| 5,352,400 A | 10/1994 | West | |
| 5,373,080 A | 12/1994 | Imashiro et al. | |
| 5,519,085 A | 5/1996 | Ma et al. | |
| 5,554,739 A | 9/1996 | Belmont | |
| 5,571,311 A | 11/1996 | Belmont et al. | |
| 5,609,671 A | 3/1997 | Nagasawa | |
| 5,672,198 A | 9/1997 | Belmont | |
| 5,698,016 A | 12/1997 | Adams et al. | |
| 5,707,432 A | 1/1998 | Adams et al. | |
| 5,713,993 A | 2/1998 | Grezzo Page et al. | |
| 5,718,746 A | 2/1998 | Nagasawa et al. | |
| 5,747,562 A | 5/1998 | Mahmud et al. | |
| 5,749,950 A | 5/1998 | Mahmud et al. | |
| 5,750,594 A | 5/1998 | Page et al. | |
| 5,753,016 A | 5/1998 | Hayashi et al. | |
| 5,801,738 A | 9/1998 | Stoffel et al. | |
| 5,803,959 A | 9/1998 | Johnson et al. | |
| 5,837,045 A | 11/1998 | Johnson et al. | |
| 5,846,307 A | 12/1998 | Nagasawa et al. | |
| 5,851,280 A | 12/1998 | Belmont et al. | |
| 5,861,447 A | 1/1999 | Nagasawa et al. | |
| 5,885,335 A | 3/1999 | Adams et al. | |
| 5,895,522 A | 4/1999 | Belmont et al. | |
| 5,922,118 A | 7/1999 | Johnson et al. | |
| 5,928,419 A | 7/1999 | Uemura et al. | |
| 5,929,188 A | 7/1999 | Nakamura et al. | |
| 5,976,233 A | 11/1999 | Osumi et al. | |
| 6,020,397 A | 2/2000 | Matzinger | |
| 6,040,358 A | 3/2000 | Page et al. | |
| 6,057,384 A | 5/2000 | Nguyen et al. | |
| 6,099,632 A | 8/2000 | Nagasawa et al. | |
| 6,121,406 A | 9/2000 | Imashiro et al. | |
| 6,123,759 A | 9/2000 | Mise et al. | |
| 6,152,999 A * | 11/2000 | Erdtmann et al. | 106/31.6 |
| 6,153,001 A | 11/2000 | Suzuki et al. | |

FOREIGN PATENT DOCUMENTS

| | | |
|---|---|---|
| EP | 0 259 511 A1 | 3/1988 |
| EP | 0 274 402 A2 | 7/1988 |
| EP | 0 277 361 A1 | 8/1988 |
| EP | 0 241 805 B1 | 1/1991 |
| EP | 0 556 649 B1 | 8/1993 |
| EP | 0 628 582 B1 | 12/1994 |
| EP | 0 900 831 B1 | 3/1999 |
| EP | 1 086 997 A2 | 3/2001 |
| EP | 1 114 851 A1 | 7/2001 |
| EP | 1 122 286 A1 | 8/2001 |
| EP | 1 158 030 A2 | 11/2001 |
| EP | 1 167 471 A2 | 7/2004 |
| GB | 2 351 292 A | 12/2000 |
| JP | 05287229 | 2/1993 |
| JP | 2001279151 | 10/2001 |
| WO | WO 01/10963 A1 | 2/2001 |
| WO | WO 01/25340 A1 | 4/2001 |
| WO | WO 01/94476 A2 | 12/2001 |
| WO | WO 03/029007 A2 | 4/2003 |
| WO | WO 2005/049744 A1 | 6/2005 |

OTHER PUBLICATIONS

International Search Report, 2004.
International Search Report.

* cited by examiner

*Primary Examiner*—Manish S Shah

(57) ABSTRACT

This invention pertains to an inkjet ink including a polycarbodiimide groups-containing component, various ink sets comprising this ink, including one ink set with at least one co-reactive ink, and a method of printing with the ink and ink sets. When the inks are printed onto a substrate, the polycarbodiimide groups can chemically react to enhance the durability of the printed image.

7 Claims, No Drawings

INKJET INK, INK SET AND METHOD OF PRINTING

CROSS-REFERENCE TO RELATED APPLICATIONS

This application claims priority under 35 U.S.C. §119 from U.S. Provisional Application Ser. No. 60/465,955 (filed Apr. 28, 2003), the disclosure of which is incorporated by reference herein for all purposes as if fully set forth.

BACKGROUND OF THE INVENTION

This invention pertains to an inkjet ink comprising, as a binder additive, a polycarbodiimide groups-containing compound, an ink set comprising this ink and a second co-reactive ink, and a method of printing with the ink and ink set. The co-reactive components of the ink set, when the inks are printed onto a substrate, chemically react to enhance the durability of the printed image.

Inkjet printing is a non-impact printing process in which droplets of ink are deposited on print media, such as paper, to form the desired image. The droplets are ejected from a printhead in response to electrical signals generated by a microprocessor. Inks used in such recording are subject to rigorous demands including, for example, good dispersion stability, ejection stability, and good fixation to media.

Inkjet printers offer low cost, high quality printing and have become a popular alternative to other types of printers such as laser printers. However, inkjet printers are presently unable to match the speed of laser printers and the durability of the laser printed images. Inkjet prints with increased durability would be highly advantageous.

U.S. Pat. No. 4,694,302 describes a two-pen configuration wherein one pen contains aluminium chloride in aqueous vehicle and the second pen contains a colored ink with carboxymethyl cellulose (CMC) in aqueous vehicle. When jetted together on a substrate, an insoluble salt of CMC is formed, producing a protective coating. The print was reported to be very water-fast.

U.S. Pat. No. 6,020,397 describes an inkjet printing process wherein a first liquid comprising aziridine and a second liquid comprising a polymer reactive with aziridine are sequentially applied to a substrate, thereby forming an aziridine-crosslinked polymer. Good ink adhesion was reported.

U.S. Pat. No. 6,503,307 describes a set of liquid compositions wherein a first liquid comprises a first water-soluble compound having an ethylenically unsaturated double bond with an alpha-electron withdrawing group and a second liquid comprises a second water soluble compound having an active hydrogen addable to the first compound. Colorant can be present in either liquid. When printed together on a substrate, the first and second liquids can react to form a polymeric film. Water and abrasion resistance are reported to be excellent.

US20020156153 describes a two-part fixative comprising (1) a reactive monomer or oligomer, selected from the group of isocyanates and epoxy terminated oligomers, in a vehicle and (2) at least one second component, selected from polyols and polyvinyl alcohols, and base catalyst. The reactive monomer or oligomer reacts with the second component on the print medium to form a polymer. Water-, smear- and smudge-fastness are reported to be enhanced.

The disclosures of all of the above-identified publications are incorporated by reference herein for all purposes as if fully set forth.

Still there is a need for inks and printing methods that provide more physically durable inkjet images.

SUMMARY OF THE INVENTION

In accordance with one aspect, the present invention pertains to an inkjet ink comprising a vehicle and a carbodiimide groups-containing component dispersed and/or dissolved in the vehicle, wherein the carbodiimide groups-containing component comprises monomer, oligomer or polymer molecules, or mixtures of one or more thereof, possessing on average at least two carbodiimide groups per molecule. The inkjet ink may be colored by further comprising a colorant, or may not contain a colorant (uncolored). If uncolored, the aqueous inkjet ink is preferably substantially clear (so as to not impart any off color to a colored ink in an ink set).

In accordance with another aspect of the present invention, there is provided an ink set comprising at least three differently colored inks, wherein at least one of the inks is an inkjet ink as set forth above, and/or wherein the ink set further comprises another ink which is an non-colored inkjet ink as set forth above.

In accordance with another aspect of the present invention, there is provided another ink set comprising at least two inks, wherein at least one of the inks is an inkjet ink as set forth above, and wherein at least one other ink is a co-reactive ink comprising a vehicle and a co-reactive species containing one or more moieties reactive with the carbodiimide groups.

In yet another aspect of the present invention, there is provided a method for ink jet printing onto a substrate, comprising the steps of:

(a) providing an ink jet printer that is responsive to digital data signals;

(b) loading the printer with a substrate to be printed;

(c) loading the printer with an ink as set forth above and described in further detail below, or an ink jet ink set as set forth above and described in further detail below; and (d) printing onto the substrate using the ink or inkjet ink set in response to the digital data signals.

Preferred substrates include plain paper and textiles.

These and other features and advantages of the present invention will be more readily understood by those of ordinary skill in the art from a reading of the following detailed description. It is to be appreciated that certain features of the invention which are, for clarity, described above and below in the context of separate embodiments, may also be provided in combination in a single embodiment. Conversely, various features of the invention that are, for brevity, described in the context of a single embodiment, may also be provided separately or in any subcombination. In addition, references in the singular may also include the plural (for example, "a" and "an" may refer to one, or one or more) unless the context specifically states otherwise. Further, reference to values stated in ranges include each and every value within that range.

DETAILED DESCRIPTION OF THE PREFERRED EMBODIMENTS

Carbodiimide Groups-Containing Component

By "carbodiimide groups-containing component" is meant a composition of one or more monomer, oligomer or polymer molecules, or mixtures of one or more thereof, comprising on average at least two (2) carbodiimide groups per molecule.

A carbodiimide group is a linear triatomic moiety generally depicted by Formula (I)

At least one of the nitrogens will be linked to or incorporated into a backbone or other bridging group to result in a molecule having at least two carbodiimide groups. Molecules containing two or more carbodiimide groups will be referred to as "polycarbodiimides" and for convenience abbreviated "pCDI".

In one embodiment, the polycarbodiimides comprising at least two units can be represented by Formula (II):

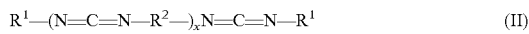

wherein $R^1$ and $R^2$ are independently alkylene or arylene, preferably having from 1 to 24 carbon atoms.

It should be noted that, unless otherwise specifically stated, a lower case x, y or n in any of the chemical formulas and structures herein (described above or shown below) represents a positive integer.

Polycarbodiimides described by formula (II) have been disclosed in U.S. Pat. No. 4,977,219 and EP-A-0277361 (the disclosures of which are incorporated by reference herein for all purposes as if fully set forth). For example, pCDI of formula (II) wherein $R^1$=butyl, $R^2$=isophorone and x=3 (median value), can be made by reacting butyl isocyanate and isophorone diisocyanate in an ester solvent with phospholene oxide as a catalyst. The chain length can be controlled by the ratio of the mono and difunctional isocyanates, but there is always a distribution around the median x value.

EP-A-0628582 (the disclosure of which is incorporated by reference herein for all purposes as if fully set forth) discloses pCDI of formula (II) wherein both $R^1$ and $R^2$ are aromatic. For example $R^1$=phenyl and $R^2$=tolyl.

Previously incorporated EP-A-0277361 discloses a mixed aliphatic and aromatic polycarbodiimide cross-linker, wherein each molecule contains some aliphatic and some aromatic carbodiimides.

Examples of commercially available pCDI's include Ucarlnk® XL-29SE (Union Carbide) and EX-5558 (from Stahl Holland bv). Further examples of pCDI's are described in U.S. Pat. No. 5,081,173, U.S. Pat. No. 5,047,588, U.S. Pat. No. 5,136,006, U.S. Pat. No. 5,373,080, EP-A-0241805, U.S. Pat. No. 4,487,964, EP-A-0259511, EP-A-0274402, EP-A-0277361 and U.S. Pat. No. 5,258,481 (the disclosures of which are incorporated by reference herein for all purposes as if fully set forth).

Polycarbodiimides can be polymers with a plurality carbodiimide groups appended to the polymer backbone. For example, U.S. Pat. No. 5,352,400 (the disclosure of which is incorporated by reference herein for all purposes as if fully set forth) discloses polymers and co-polymers derived from alpha-methylstyryl-isocyanates. Such a polymer is illustrated in Formula (III).

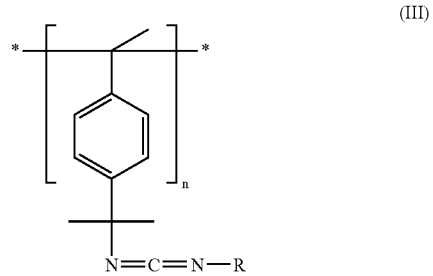

wherein R is an alkyl, cycloalykl or aryl group (preferably having from 1 to 24 carbon atoms).

Polycarbodiimides can have branched structures, like that shown in Formula (IV), and as described in Chapter 8 of *Technology for Waterborne Coatings*, E. J. Glass Ed., ACS Symposium 663, 1997; *The Application of Carbodiimide Chemistry to Coating*, by J. W. Taylor and D. R. Bassett (the disclosures of which are incorporated by reference herein for all purposes as if fully set forth).

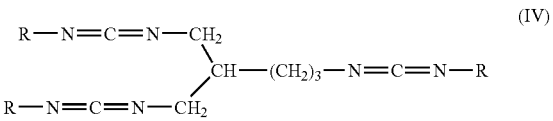

These branched structures are prepared by reacting a multifunctional branched amine with an alkyl or aryl isocyanate, and then dehydrating the resulting urea compound to the carbodiimide. The branched amine could also be a dedrimeric amine containing more than three amino groups, leading to a dendrimeric polycarbodiimide. An advantage of this type of structure is that the distribution of the number of carbodiimide groups in the pCDI species is narrower than those species described earlier.

Polycarbodiimide species for waterborne applications contain hydrophillic groups which allow them to be water soluble or dispersible. These materials can be made by condensing aliphatic or aromatic di-isocyanates, and then reacting the terminal isocyanate groups on the linear carbodiimide polymer with a hydrophilic species, e.g., an alkyl-capped polyethylene oxide. Water compatible pCDI species can be prepared by starting with aliphatic or aromatic isocyanates, to yield species like those illustrated in Formulas (V) and (VI).

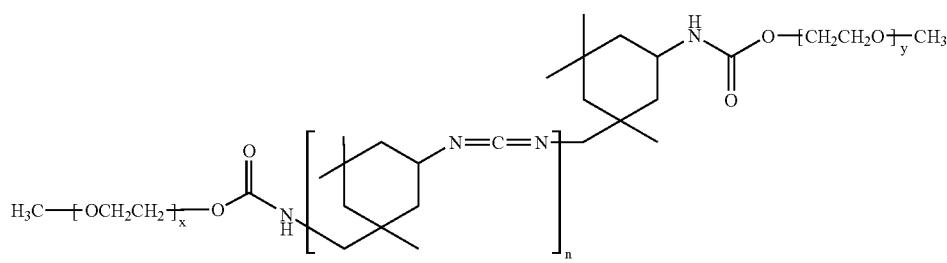

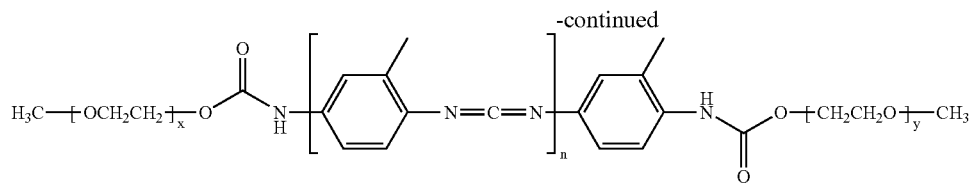

U.S. Pat. No. 6,121,406 (the disclosure of which is incorporated by reference herein for all purposes as if fully set forth) describes a hydrophilic pCDI species in which the isocyanate endgroups on the precursor are reacted with a mixture of monohydroxy compounds of different hydrophilic character, e.g., polyethylene oxide monoalkyl ether and polypropyleneoxide monoalkyl ether.

U.S. Pat. No. 5,929,188 (the disclosure of which is incorporated by reference herein for all purposes as if fully set forth) describes pCDI species that contain at least four molecular chains bonded independently to a backbone. Each of the molecular chains contains at least one carbodiimide group. The polyfunctional carbodiimide species can be produced by reacting (a) an isocyanate compound having at least one carbodiimide group and at least one isocyanate group with (b) a polyol, polyamine and/or amino alcohol having at least four hydroxyl, primary amino and/or secondary amino groups in a molecule.

U.S. Pat. No. 6,248,819 (the disclosure of which is incorporated by reference herein for all purposes as if fully set forth) describes polycarbodiimide compounds modified for hydrophilicity, which have a structure such that a carbodiimide unit and a polyol unit occur alternately via a urethane bond, and a hydrophilic unit occurs at both molecular termini and is bound to such carbodiimide unit via a urethane bond. The number of repetitions of the carbodiimide unit and polyol unit are preferably 1 to 10.

An example of a commercially available solvent-borne polycarbodiimide species is UCARLNK® Crosslinker XL-29SE. An example of a commercially available water-soluble polycarbodiimide is the Carbodilite® V series of multifunctional carbodiimides. An example of a commercially available water-dispersible polycarbodiimide is Carbodilite® E-02 (Nisshinbo Industries).

Cationic Polycarbodiimides

As described hereinafter, cationic polycarbodiimides can be advantageous for certain embodiments of this invention. Such species can be prepared by reacting a quaternized amino alcohol or amine, like those illustrated in Figures (IX) (a), (b), (c), (d) and (e), with a bis-isocyanate terminated pCDI like those described in previously incorporated U.S. Pat. No. 6,248,819 and U.S. Pat. No. 6,121,406. The bis-isocyanate terminated pCDI can, in addition, be chain extended with quaternary diols like those illustrated in Formulas (VII) (f) and (g). An example of a commercially available bis-isocyanate terminated pCDI is Carbodilite® V-05, manufactured by Nisshinbo Industries.

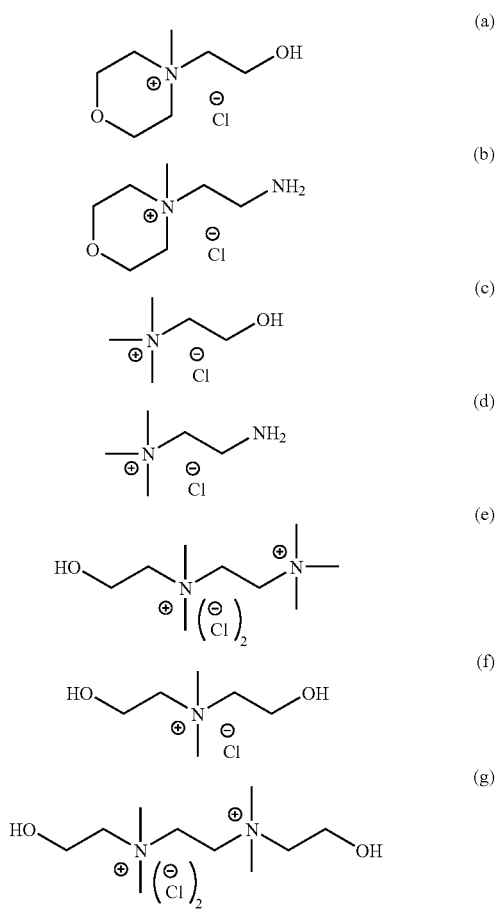

The structures below (Formulas (VIII) through (XIII)) illustrate various quaternary pCDI species, but are in no way meant to limit the concept.

(VIII)

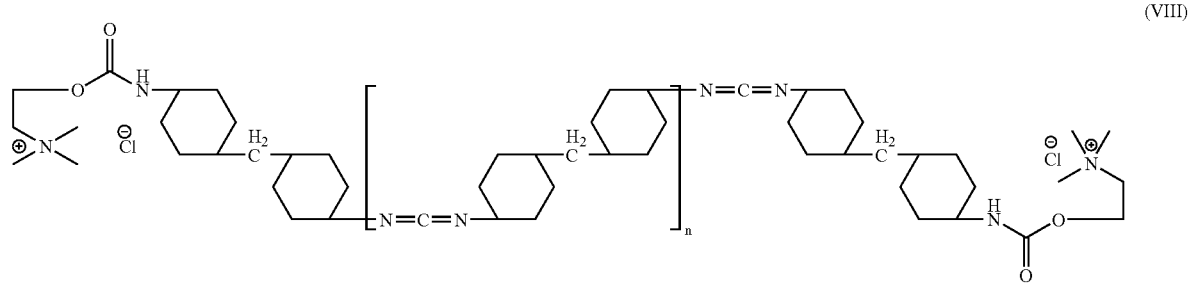

-continued
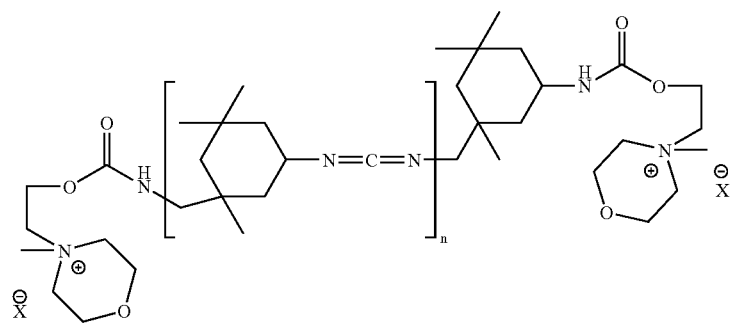
(IX)
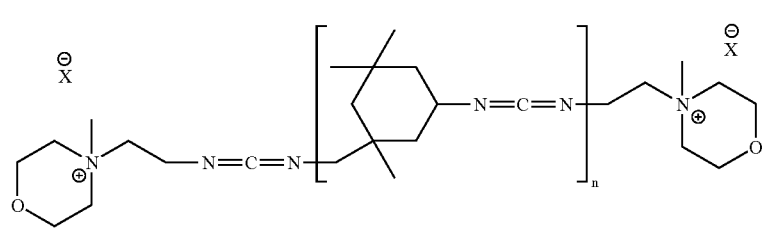
(X)
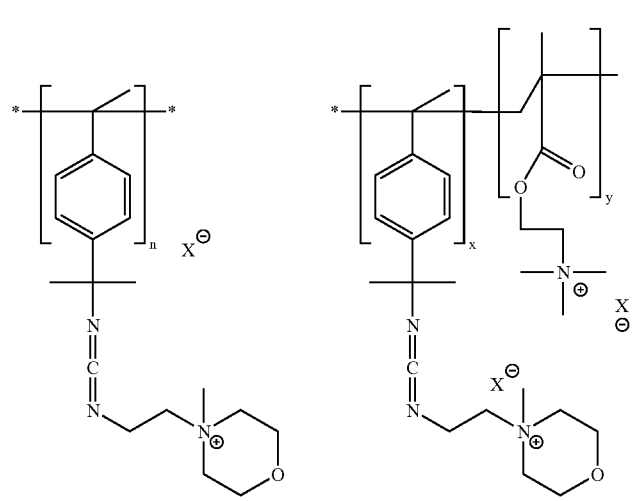
(XI)
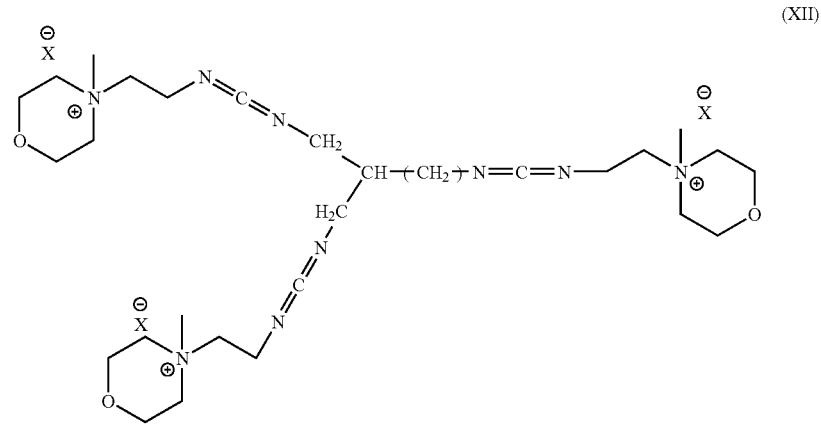
(XII)

-continued

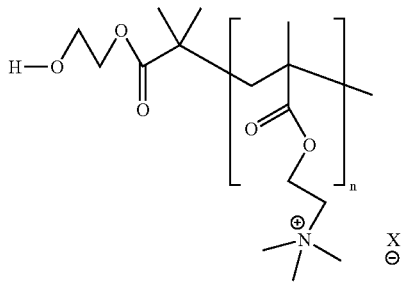

(XIII)

If desired, even more quaternary groups could be attached to the ends of a bis-isocyanate terminated pCDI by reacting an end-functionalized oligomer, like that shown in Figure (XIII). This kind of oligomer can be prepared by group transfer polymerization of dimethylaminomethacrylate starting with a silane-blocked hydroxy functional initiator. Once the oligomer is prepared, the tertiary amine groups can be quaternized with a methyl or benzyl group and the silane protected hydroxy group deblocked.

Inkjet Ink Containing pCDI

One aspect of the present invention pertains to an inkjet ink comprising a vehicle and a carbodiimide groups-containing component dispersed and/or dissolved in the vehicle. The ink may be colored by further comprising a colorant, or may not contain a colorant (uncolored). If uncolored, the ink is preferably substantially clear. Optionally, the ink may comprise other ingredients of a nature generally well known to those of ordinary skill in the art.

The carbodiimide groups-containing component may be present in the ink in one or more different capacities for a variety of functions. For example, the carbodiimide groups-containing component can be present as a polymeric dispersant for insoluble colorants (such as pigments) or other insoluble ink components. Thus carbodiimide-containing oligomers and polymers described herein could be used to prepare reactive cationic pigment dispersions. The carbodiimide group-containing component might also be a present as self-dispersed pigment particles with multiple pendant carbodiimide groups. The carbodiimide groups-containing component can also be present as an "additive" functioning as a surfactant to assist in ink stability, substrate wetting and/or bleed control, and/or as a binder to improve the durability of printed images.

The amount of pCDI in a given ink is not limited to the extent that a suitable ink can be formulated having appropriate physical properties and that can be jetted. Generally, however, the pCDI can be present in amounts up to about 20%, and more typically in the range of about 0.1 to about 10%, by weight based on the total weight of the ink. When the pCDI is polymeric, the molecular weight can be any value that provides an ink with suitable properties, but will generally be less than about 100,000, and typically less than about 15,000, number average molecular weight.

Multivalent metal ions such as divalent calcium or magnesium, or trivalent aluminum, can be added to the pCDI ink in order to precipitate or fix anionic co-reactive inks.

Colorants for the pCDI containing ink can be any compatible, non-reactive colorant, including dye or pigment, or a polymer encapsulated dye or pigment. Generally, though, colorant for an aqueous pCDI ink will be cationic or neutral.

The function of a pCDI-containing ink might be enhanced by rendering the pCDI electrostatically attractive to the co-reactive species. For example, when the co-reactive species is anionic, the pCDI could be provided in a cationic form so as to create an attraction between the two species and facilitate more effective crosslinking. Also, there can be additional benefit of fixing the colorant, thereby increasing optical density and chroma.

Vehicle

The vehicle is the liquid carrier for the ink ingredients and can be aqueous or nonaqueous.

The term "aqueous vehicle" refers to water or a mixture of water and at least one water-soluble organic solvent (co-solvent). Selection of a suitable mixture depends on requirements of the specific application, such as desired surface tension and viscosity, the selected colorant, drying time of the ink, and the type of substrate onto which the ink will be printed. Representative examples of water-soluble organic solvents that may be selected are disclosed in U.S. Pat. No. 5,085,698 (the disclosure of which is incorporated by reference herein for all purposes as if fully set forth).

If a mixture of water and a water-soluble solvent is used, the aqueous vehicle typically will contain about 30% to about 95% water with the balance (i.e., about 70% to about 5%) being the water-soluble solvent. Preferred compositions contain about 60% to about 95% water, based on the total weight of the aqueous vehicle.

The aqueous vehicle can be made to be fast penetrating (rapid drying) by including surfactants or penetrating agents such as glycol ethers and 1,2-alkanediols. Glycol ethers include ethylene glycol monobutyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1-methyl-1-methoxybutanol, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, and dipropylene glycol mono-isopropyl ether. 1,2-Alkanediols are preferably 1,2-C4-6 alkanediols, most preferably 1,2-hexanediol. Suitable surfactants include ethoxylated acetylene diols (e.g. Surfynols® series from Air Products), ethoxylated primary (e.g. Neodol® series from Shell) and secondary (e.g. Tergitol® series from Union Carbide) alcohols, sulfosuccinates (e.g. Aerosol® series from Cytec), organosilicones (e.g. Silwet® series from Witco) and fluoro surfactants (e.g. Zonyl® series from DuPont).

The amount of glycol ether(s) and 1,2-alkanediol(s) added must be properly determined, but is typically in the range of from about 1 to about 15% by weight and more typically about 2 to about 10% by weight, based on the total weight of the ink. Surfactants may be used, typically in the amount of about 0.01 to about 5% and preferably about 0.2 to about 2%, based on the total weight of the ink.

"Nonaqueous vehicle" refers to a vehicle that is substantially comprised of a nonaqueous solvent or mixtures of such solvents, which solvents can be polar and/or nonpolar. Examples of polar solvents include alcohols, esters, ketones and ethers, particularly mono- and di-alkyl ethers of glycols and polyglycols such as monomethyl ethers of mono-, di- and tri-propylene glycols and the mono-n-butyl ethers of ethylene, diethylene and triethylene glycols. Examples of nonpolar solvents include aliphatic and aromatic hydrocarbons having at least six carton atoms and mixtures thereof including refinery distillation products and by-products.

Even when no water is deliberately added to the nonaqueous vehicle, some adventitious water may be carried into the formulation, but generally this will be no more than about 2-4%. By definition, the nonaqueous ink of this invention will have no more than about 10%, and preferably no more than about 5%, by weight of water based on the total weight of the nonaqueous vehicle.

Colorants

Colorants can be soluble (dyes) or dispersed (pigments) in the ink vehicle.

Traditionally, pigments are stabilized to dispersion in a vehicle by means of dispersing agents, such as polymeric dispersants or surfactants. More recently though, so-called "self-dispersible" or "self-dispersing" pigments (hereafter "SDP") have been developed. As the name would imply, SDPs are dispersible in water, or vehicle, without dispersants. See, for example, U.S. Pat. No. 5,554,739, U.S. Pat. No. 5,571,311, U.S. Pat. No. 5,609,671, U.S. Pat. No. 5,672,198, U.S. Pat. No. 5,698,016, U.S. Pat. No. 5,707,432, U.S. Pat. No. 5,718,746, U.S. Pat. No. 5,747,562, U.S. Pat. No. 5,749,950, U.S. Pat. No. 5,803,959, U.S. Pat. No. 5,837,045, U.S. Pat. No. 5,846,307, U.S. Pat. No. 5,851,280, U.S. Pat. No. 5,861,447, U.S. Pat. No. 5,885,335, U.S. Pat. No. 5,895,522, U.S. Pat. No. 5,922,118, U.S. Pat. No. 5,928,419, U.S. Pat. No. 5,976,233, U.S. Pat. No. 6,057,384, U.S. Pat. No. 6,099,632, U.S. Pat. No. 6,123,759, U.S. Pat. No. 6,153,001, U.S. Pat. No. 6,221,141, U.S. Pat. No. 6,221,142, U.S. Pat. No. 6,221,143, U.S. Pat. No. 6,277,183, U.S. Pat. No. 6,281,267, U.S. Pat. No. 6,329,446, U.S. Pat. No. 6,332,919, U.S. Pat. No. 6,375,317, US2001/0035110, EP-A-1086997, EP-A-1114851, EP-A-1158030, EP-A-1167471, EP-A-1122286, WO01/10963, WO01/25340 and WO01/94476, the disclosures of which are incorporated by reference herein for all purposes as if fully set forth.

A pigment may be stabilized to dispersion by surface treatment to be self-dispersing (see, for example, previously incorporated WO01/94476), by treatment with dispersant in the traditional way, or by some combination of surface treatment and dispersant.

Preferably, when a dispersant is employed, the dispersant (s) is a random or structured polymeric dispersant. Preferred random polymers include acrylic polymer and styrene-acrylic polymers. Most preferred are structured dispersants which include AB, BAB and ABC block copolymers, branched polymers and graft polymers. Some useful structured polymers are disclosed in U.S. Pat. No. 5,085,698, EP-A-0556649 and U.S. Pat. No. 5,231,131 (the disclosures of which are incorporated by reference herein for all purposes as if fully set forth).

An example of a pigment dispersion made with block co-polymers containing both carboxylate and primary amine functionalities is described in U.S. Pat. No. 6,306,994 (the disclosure of which is incorporated by reference herein for all purposes as if fully set forth).

The preceding dispersion examples are predominantly anionicaly stabilized. Examples of cationically stabilized dispersions include those made with quaternary polymer such as block polymers of methyl methacrylate and dimethylaminoethyl-methacrylate or benzyl methacrylate and dimethylaminoethylmethacrylate that have been quaternized with benzyl chloride, dimethyl sulfate, or methyl chloride. The preparation of such pigment dispersions is described in U.S. Pat. No. 5,801,738, U.S. Pat. No. 5,750,594 and U.S. Pat. No. 5,713,993 (the disclosures of which are incorporated by reference herein for all purposes as if fully set forth).

Examples of quaternary self-dispersed pigments include those with pendant quaternized amine groups. The preparation of such pigments is described in U.S. Pat. No. 5,851,280 and U.S. Pat. No. 6,221,143 (the disclosures of which are incorporated by reference herein for all purposes as if fully set forth).

Representative commercial pigments in dry form include the following:

| Trade Name | Manufacturer | Color Index (CI) Pigment Name |
|---|---|---|
| Permanent Yellow DHG | Hoechst | Yellow 12 |
| Permanent Yellow GR | Hoechst | Yellow 13 |
| Permanent Yellow G | Hoechst | Yellow 14 |
| Permanent Yellow NCG-71 | Hoechst | Yellow 16 |
| Permanent Yellow NCG-71 | Hoechst | Yellow 16 |
| Permanent Yellow GG | Hoechst | Yellow 17 |
| Hansa Yellow RA | Hoechst | Yellow 73 |
| Hansa Brilliant Yellow 5GX-02 | Hoechst | Yellow 74 |
| Dalamar ® Yellow YT-858-D | Heubach | Yellow 74 |
| Hansa Yellow X | Hoechst | Yellow 75 |
| Novoperm ® Yellow HR | Hoechst | Yellow 83 |
| Chromophtal ® Yellow 3G | Ciba-Geigy | Yellow 93 |
| Chromophtal ® Yellow GR | Ciba-Geigy | Yellow 95 |
| Novoperm ® Yellow FGL | Hoechst | Yellow 97 |
| Hansa Brilliant Yellow 10GX | Hoechst | Yellow 98 |
| Permanent Yellow G3R-01 | Hoechst | Yellow 114 |
| Chromophtal ® Yellow 8G | Ciba-Geigy | Yellow 128 |
| Irgazin ® Yellow 5GT | Ciba-Geigy | Yellow 129 |
| Hostaperm ® Yellow H4G | Hoechst | Yellow 151 |
| Hostaperm ® Yellow H3G | Hoechst | Yellow 154 |
| L74-1357 Yellow | Sun Chem | |
| L75-1331 Yellow. | Sun Chem | |
| L75-2377 Yellow | Sun Chem. | |
| Hostaperm ® Orange GR | Hoechst | Orange 43 |
| Paliogen ® Orange | BASF | Orange 51 |
| Irgalite ® Rubine 4BL | Ciba-Geigy | Red 57:1 |
| Quindo ® Magenta | Mobay | Red 122 |
| Indofast ® Brilliant Scarlet | Mobay | Red 123 |
| Hostaperm .RTM. Scarlet GO | Hoechst | Red 168 |
| Permanent Rubine F6B | Hoechst | Red 184 |
| Monastral ® Magenta | Ciba-Geigy | Red 202 |
| Heliogen .RTM. Blue L 6901F | BASF | Blue 15:2 |
| Heliogen ® Blue NBD 7010 | BASF | |
| Heliogen ® Blue K 7090 | BASF | Blue 15:3 |
| Heliogen ® Blue L 7101F | BASF | Blue 15:4 |
| Paliogen ® Blue L 6470 | BASF | Blue 60 |
| Heucophthal ® Blue G, XBT-583D | Heubach | Blue 15:3 |
| Heliogen ® Green K 8683 | BASF | Green 7 |
| Heliogen ® Green L 9140 | BASF | Green 36 |
| Monastral ® Violet R | Ciba-Geigy | Violet 19 |
| Monastral ® Red B | Ciba-Geigy | Violet 19 |
| Quindo ® Red R6700 | Mobay | |

-continued

| Trade Name | Manufacturer | Color Index (CI) Pigment Name |
|---|---|---|
| Quindo ® Red R6713 | Mobay | |
| Indofast ® Violet | Mobay | Violet 23 |
| Monastral ®. Violet Maroon B | Ciba-Geigy | Violet 42 |
| Special Black 4A | Degussa | Black 7 |
| Sterling ® NS 76 Black | Cabot | Black 7 |
| Sterling ® NSX 76 | Cabot | Black 7 |
| Mogul L | Cabot | Black 7 |

Representative commercial pigments available in the form of a water-wet presscake include: Heucophthal® Blue BT-585-P, Toluidine Red Y (C.I. Pigment Red 3), Quindo® Magenta (Pigment Red 122), Magenta RV-6831 presscake (Mobay Chemical, Harmon Division, Haledon, N.J.), Sunfast.®. Magenta 122 (Sun Chemical Corp., Cincinnati, Ohio), Indo® Brilliant Scarlet (Pigment Red 123, C.I. No. 71145), Toluidine Red B (C.I. Pigment Red 3), Watchung® Red B (C.I. Pigment Red 48), Permanent Rubine F6B13-1731 (Pigment Red 184), Hansa® Yellow (Pigment Yellow 98), Dalamar® Yellow YT-839-P (Pigment Yellow 74, C.I. No. 11741, Sunbrite.® Yellow 17 (Sun Chemical Corp, Cincinnati, Ohio), Toluidine Yellow G (C.I. Pigment Yellow 1), Pigment Scarlet (C.I. Pigment Red 60), Auric Brown (C.I. Pigment Brown 6), etc. Black pigments, such as carbon black, generally are not available in the form of aqueous presscakes.

Cationic dyes typically have a structural skeleton of cyanine, azo, azomethine, xanthene, triphenylmethane, methine, polymethine, phthalocyanine, or the like. Cationic dyes include C.I. Basic Yellow 1, C.I. Basic Yellow 11, C. I. Basic Yellow 13, C.I. Basic Yellow 19, C.I. Basic Yellow 21, C.I. Basic Yellow 25, C.I. Basic Yellow 33, C.I. Basic Yellow 36, C.I. Basic Red 1, C.I. Basic Red 2, C.I. Basic Red 9, C.I. Basic Red 12, C.I. Basic Red 13, C.I. Basic Red 38, C.I. Basic Red 39, C.I. Basic Red 92, C.I. Basic Blue 1, C.I. Basic Blue 3, C.I. Basic Blue 5, C.I. Basic Blue 9, C. I. Basic Blue 19, C.I. Basic Blue 24, C.I. Basic Blue 25, C.I. Basic Blue 26, C.I. Basic Blue 28, C.I. Basic Blue 45, C.I. Basic Blue 54, and C.I. Basic Blue 65. These dyes may be used in combination for preparation of a black ink.

Anionic dyes include Acid Yellow 11, Acid Yellow 17, Acid Yellow 23, Acid Yellow 25, Acid Yellow 29, Acid Yellow 42, Acid Yellow 49, Acid Yellow 61, Acid Yellow 71, Direct Yellow 12, Direct Yellow 24, Direct Yellow 26, Direct Yellow 44, Direct Yellow 86, Direct Yellow 87, Direct Yellow 98, Direct Yellow 100, Direct Yellow 130, Direct Yellow 86, Direct Yellow 132, Direct Yellow 142, Acid Red 1, Acid Red 6, Acid Red 8, Acid Red 32, Acid Red 35, Acid Red 37, Acid Red 51, Acid Red 52, Acid Red 80, Acid Red 85, Acid Red 87, Acid Red 92, Acid Red 94, Acid Red 115, Acid Red 180, Acid Red 254, Acid Red 256, Acid Red 289, Acid Red 315, Acid Red 317, Direct Red 1, Direct Red 4, Direct Red 13, Direct Red 17, Direct Red 23, Direct Red 28, Direct Red 31, Direct Red 62, Direct Red 79, Direct Red 81, Direct Red 83, Direct Red 89, Direct Red 227, Direct Red 240, Direct Red 242, Direct Red 243, Acid Blue 9, Acid Blue 22, Acid Blue 40, Acid Blue 59, Acid Blue 93, Acid Blue 102, Acid Blue 104, Acid Blue 113, Acid Blue 117, Acid Blue 120, Acid Blue 167, Acid Blue 229, Acid Blue 234, Acid Blue 254, Direct Blue 6, Direct Blue 22, Direct Blue 25, Direct Blue 71, Direct Blue 78, Direct Blue 86, Direct Blue 90, Direct Blue 106, Direct Blue 199.

The black colorant may also be a dye as, for example, the black dye disclosed in U.S. Pat. No. 5,753,016 (the disclosure of which is incorporated by reference herein for all purposes as if fully set forth). The black colorant may also be a combination of dye and pigment as, for example, disclosed in previously incorporated U.S. Pat. No. 6,277,184.

Other Ingredients

Other ingredients may be formulated into the inkjet ink, to the extent that such other ingredients do not interfere with the stability and jetablity of the ink, which may be readily determined by routine experimentation. Such other ingredients are in a general sense well known in the art.

Biocides may be used to inhibit growth of microorganisms.

Inclusion of sequestering (or chelating) agents such as ethylenediaminetetraacetic acid (EDTA), iminodiacetic acid (IDA), ethylenediamine-di(o-hydroxyphenylacetic acid) (EDDHA), nitrilotriacetic acid (NTA), dihydroxyethylglycine (DHEG), trans-1,2-cyclohexanediaminetetraacetic acid (CyDTA), dethylenetriamine-N,N,N',N'',N''-pentaacetic acid (DTPA), and glycoletherdiamine-N,N,N',N'-tetraacetic acid (GEDTA), and salts thereof, may be advantageous, for example, to eliminate deleterious effects of heavy metal impurities.

The inks can contain compatible polymers other than pCDI and co-reactive species. The oligomers or polymers can be based on acrylic, urethane, polyester, polyamide, polyvinyl, polyether, polyamine and cellulosic structures; the polymer or oligomer structures could include random, block, branched, star or dendrimer structures. They can be soluble, or present as a dispersion, latex or hydrosol. The latex or dispersion particles can have a homogeneous or core/shell structure.

Ink Properties

Drop velocity, separation length of the droplets, drop size and stream stability are greatly affected by the surface tension and the viscosity of the ink. Ink jet inks typically have a surface tension in the range of about 20 dyne/cm to about 70 dyne/cm at 25° C. Viscosity can be as high as 30 cP at 25° C. (30 cP or less), but is typically somewhat lower. The ink has physical properties are adjusted to the ejecting conditions and printhead design. The inks should have excellent storage stability for long periods so as not clog to a significant extent in an ink jet apparatus. Further, the ink should not corrode parts of the inkjet-printing device it comes in contact with, and it should be essentially odorless and non-toxic.

The ink set of this invention can be particularly advantageous for applications where low viscosity is required. Thus the viscosity (at 25° C.) of the inventive inks can be less than about 7 cps, or less than about 5 cps, and even less than about 3.5 cps.

Proportions of Ingredients

The components described above and below (co-reactive components) can be combined to make an ink in various proportions and combinations in order to achieve desired ink properties, as generally described above, and as generally recognized by those of ordinary skill in the art. Some experimentation may be necessary to optimize inks for a particular end use, but such optimization is generally within the ordinary skill in the art.

For example, the amount of vehicle in an ink, whether aqueous or non-aqueous, is typically in the range of about 70% to about 99.8%, and preferably about 80% to about 99.8%, based on total weight of the ink.

In a colored ink, colorant will generally be present in amounts up to about 12%, and more typically in the range of about 0.1 to about 9%, by weight of the total ink. Dispersants, when needed for stabilization of an insoluble colorant, are employed at levels based on the amount of colorant and are usually expressed as a weight ratio. Generally, dispersants are employed at a pigment-to-dispersant weight ratio in the range of about 1:3 to about 4:1.

Other ingredients (additives), when present, generally comprise less than about 15% by weight, based on the total weight of the ink. Surfactants, when added, are generally in the range of about 0.2 to about 3% by weight based on the total weight of the ink. Polymers other than pCDI and co-reactives species can be added as needed, but will generally be less than about 15% by weight based on the total weight of the ink.

Ink Sets

One of the ink sets in accordance with the present invention preferably comprises at least three differently colored inks (such as CMY), and preferably at least four differently colored inks (such as CMYK), wherein at least one of the inks is an aqueous inkjet ink as described above, containing the carbodiimide groups-containing component.

Alternatively, the ink containing the carbodiimide groups-containing component does not contain any colorant meaning that, in addition to the colored inks described above, the ink set will further comprise another ink which is an non-colored inkjet ink comprising a vehicle and an carbodiimide groups-containing component.

The other inks of the ink set may contain dyes, pigments or combinations thereof as the colorant. Such other inks are based on vehicles and other components and additives as described above and may, in a general sense, be considered known to those of ordinary skill in the art.

Co-Reactive Ink Sets

The instant invention further pertains to an inkjet ink set comprising at least a first and second ink, wherein said first ink comprises a first vehicle and a pCDI species (carbodiimide groups-containing component), and said second ink comprises a second vehicle and a "co-reactive" species. The "co-reactive" species is so designated because it contains one or more moieties that chemically react with the carbodiimide moieties of the pCDI species to form a covalent bond. When the first and second ink are jetted onto the same area of the substrate, the two inks mix and the co-reactive species can react with the pCDI species. Preferably the co-reactive species comprises a plurality of co-reactive groups so that reaction with the pCDI species yields an at least partially crosslinked polymer which imparts durability to the printed image. The reaction can generally be accelerated by elevated temperature, but heating is not necessary as reaction will preferably also take place at acceptable rates at ambient temperature.

Herein, reference to "durability" or "fastness" generally means the resistance of the printed image to color removal such as, for example, rub resistance (finger rub), water fastness (water drop), smear fastness (highlighter pen stroke) or crock fastness on textile.

Either one or both of the first and second inks can further comprise colorant. In the case where the first and second inks contain no colorant, application is generally in the form of an overcoat. Typically though, at least one of the inks will contain colorant. Generally, the ink set will comprise at least three inks with colorant and at least one ink without colorant. The ink without colorant will contain either the pCDI species or the co-reactive species, and the inks with colorant will contain the companion species not contained in the ink without colorant.

Colorant in the co-reactive ink will, in general, be anionic or neutral. When the hydrophillic groups on the colorant are also carbodiimide-reactive (e.g. carboxylate or amines), the colorant can also serve as (one of) the co-reactive species.

The inks can also contain other ingredients as are well known in the art, and as described above. Adaptation of the ink formulation to a particular inkjet printer may be needed to provide an appropriate balance of properties such as, for instance, viscosity and surface tension.

A consideration in the formulation of the co-reactive inks pertains to additives that contain a single carbodiimide reactive group. Such monofunctional additives can react with a pCDI and tie up a potential crosslinking site. In some cases bonding an additive into the ink layer could be beneficial, but it reduces available crosslinking sites for the multifunctional co-reactive species. Generally, it is preferred that substantially all the carbodiimide reactive groups present in the co-reactive ink are ones attached to the co-reactive species.

Co-Reactive Species.

A co-reactive species is a material comprised preferably of a plurality of moieties (one or more types) that react with carbodiimide groups. A co-reactive species could be unstable if mixed together with polycarbodiimide species in one ink. Thus the combination of co-reactive species and polycarbodiimide species is jetted as separate inks, and mixing is accomplished on the printed substrate.

Carbodiimide-reactive groups include groups with active hydrogen such as carboxyls, hydroxyls, phenols, beta-diketones, thiols, and primary and secondary amines. Sulfonate and phosphonate groups will also react with a carbodiimide in a condensed film that is mostly free of water, but the reaction tends to be slower.

Preferably, the co-reactive species comprises more than one moiety that will react with carbodiimide groups so that the reaction of co-reactive species and pCDI species yields a crosslinked (durable) printed layer. The co-reactive species can be a polyfunctional molecule, an oligomer or a polymer, and can be soluble in the vehicle or dispersed (e.g. latex, emulsion, or hydrosol) as a separate phase. The oligomers or polymers can be based on acrylic urethane, polyester, polyamide, polyvinyl, polyether, polyamine and cellulosic structures; the polymer or oligomer structures could include random, block, branched, star or dendrimer structures. Latex or dispersion particles can have a homogeneous or core/shell structure.

The co-reactive species may be present in the ink in one or more different capacities for a variety of functions. For example, the co-reactive species can be present as a polymeric dispersant for insoluble colorants (such as pigments) or other insoluble ink components. The co-reactive species might also be a present as self-dispersed pigment particles with multiple pendant co-reactive groups. The co-reactive species can also be present as an "additive" as a surfactant and/or as a binder.

The co-reactive species can be single type of co-reactive moiety or a combination of two or more different types of co-reactive moieties.

Carboxylic acids react with 1,3-carbodiimide groups at room temperature, in polar environments or in the presence of tertiary amines, to form acyl urea linkage. Amines react with 1,3-carbodiimide groups, albeit at a slower rate than carboxylates, to yield guanidines. Other active hydrogen groups are also known to react with 1,3-carbodiimide groups, including hydroxyl, phenolic, beta keto structures and mercaptans. A review of 1,3-carbodiimide chemistry has been written by Williams and Ibrahim in *Chemical Reviews*, 81, 589-636, 1981 (the disclosure of which is incorporated by reference herein for all purposes as if fully set forth).

The rate at which a given pCDI species reacts with an active hydrogen compound depends on a number of factors. Aliphatic pCDI's are more reactive (as much as 50×) than aromatic ones, and the reaction rate can be further reduced, if desired, by adding steric hinderance near the CDI groups. The pCDI's react with sulfonates and phosphates at a much slower rate than carboxylates. The reaction of pCDI's with any of these acid groups is much slower in the presence of water.

A faster reaction of a carboxylated resin with a pCDI occurs at a weakly acid to neutral pH, and is somewhat slower under alkaline conditions. If the carboxylate species is neutralized, a tertiary amine is preferred. Ammonia can also be used, but an excess can lead to a loss of crosslinking ability of the pCDI. The pH of the ink containing the pCDI species is preferably in the range of 7 to 9 for good storage stability.

The desired rate at which the pCDI species and the co-reactive species react may depend on the requirements of the printed item. In some instances a very fast crosslinking may be desirable, for example the printed item needs to have water fastness or smear resistance immediately after printing. In this case, a fast reaction accelerated by some heating would be beneficial. However, if the ink containing the co-reactive species contains a polymer latex or dispersion with reactive groups, it may be desirable for these components to coalesce before the crosslinking has progressed to a substantial degree so that a crosslinked continuous printed layer is obtained rather than a layer of weakly adhered crosslinked particles.

Polyamine Co-reactive Species

Monomeric polyamines suitable as co-reactive species include members selected from the group $NH_2(CH_2)_nNH_2$, where n is an integer from 2 to 8, such as ethylenediamine, propylene diamine, tetramethylene diamine, pentamethylene diamine, hexamethylene diamine, heptamethylene diamine and octamethylene diamine. Also included are members selected from the group $H_2NCH_2CH_2(NHCH_2CH_2)_nNH_2$, where n is an integer from 1 to 4, such as diethylene triamine, triethylene tetramine, and tetraethylene pentamine.

Representative polymeric polyamines useful as co-reactive species include polyethyleneimine, polyvinylamine, polydiallylamine, polyallylamine, poly(vinylamine-co-vinylalcohol) and polyaminoamides prepared by reaction of polyalkyene polyamines with aliphatic dicarboxylic acids. An example of the last is the polyaminoamide prepared by reaction of diethylene triamine with adipic acid.

Other useful polyamines include amine derivatives of a polyol: polyethylene oxides, and glycerin having a terminal amino group, including the compounds represented by structural formulas B-1 and B-2 described and illustrated in U.S. Pat. No. 6,503,307 (the disclosure of which is incorporated by reference herein for all purposes as if fully set forth). Also useful are polymers of ethylenimine, including the compounds represented by structural formula B-3 described and illustrated in previously incorporated U.S. Pat. No. 6,503, 307. Commercial products corresponding to these materials include, for example, Lupasol® FG, Lupasol® G20 water-free, Lupasol® G20, Lupasol® G35 and Lupasol® WF, from BASF Co.; and Epomin® SP-006, Epomin® SP-012, Epomin® SP-018, Epomin® SP-200, Epomin® PP-061, Epomin® PP-1000, from Nippon Shokubai Kagaku K.K.

Other useful polyamines can also include glucosamine; dimers of glucosamine; amino sugars of 3- to 10-mer of glucosamine; and oligomers of sugar structures, for example partial acetylation, having plural primary amino groups in the molecule. These compounds may be modified in the structure, provided that the modified compound is water-soluble.

The specific examples are shown by structural formulas B-4 to B7 described and illustrated in previously incorporated U.S. Pat. No. 6,503,307.

Polycarboxylate Co-Reactive Species

Acrylic resins such as polyacrylic acid, acrylic acid-acrylonitrile copolymer, potassium acrylate-acrylonitrile copolymer, vinyl acetate-acrylate ester copolymers and acrylic acid-acrylate ester copolymers; styrene-acrylic resins such as styrene-acrylic acid co-polymer, styrene-methacrylic acid copolymer, styrene-methacrylic acid-acrylate ester co-polymers, styrene-alphamethylstyrene-acrylic acid copolymer, styrene-alpha-methylstyrene-acrylic acid-acrylate ester copolymers; styrene-maleic acid copolymer, styrene-maleic anhydride copolymer, vinyl naphthalene-acrylic acid copolymer, vinyl naphthalene-maleic acid copolymer; and vinyl acetate copolymers such as vinyl acetate-ethylene copolymer, vinyl acetate-fatty acid vinyl ethylene copolymers, vinyl acetate-maleate ester copolymers, vinyl acetate-crotonic acid copolymer and vinyl acetate-acrylic acid copolymer; isobutylene-maleic acid resin, rosin-modified maleic acid resin, alginic acid derivatives, carboxymethyl cellulose or carboxymethyl starch, carboxylated polyester, carboxylated cellulose acetate butyrate and salts thereof.

Poly Beta-diketone Co-Reactive Species

Examples include latex particles with pendant beta-keto groups incorporated into a styrene, lauryl methacrylate, methacrylic acid emulsion latex with the addition of methacryloylacetone to the polymerization, as described in EP-A-0900831 (the disclosure of which is incorporated by reference herein for all purposes as if fully set forth).

Another example includes, as described in U.S. Pat. No. 6,040,358 (the disclosure of which is incorporated by reference herein for all purposes as if fully set forth), the water dispersible beta-diketone acrylic co-polymers with 5-40% by weight of a polymerizable beta-diketone and 5 to 50% by weight of another polymerized moiety that renders the polymer soluble upon neutralization. Preferred beta-diketone monomers would include acetoacetoxy ethyl methacrylate, acetoacetamide ethyl methacrylate, and methacryloylacetone.

Polythiol Co-Reactive Species

Examples of useful water-soluble polythiol compounds are shown by structural formulas B-8 to B-17, described and illustrated in previously incorporated U.S. Pat. No. 6,503, 307.

Substrates

The substrate can be any suitable substrate including plain paper, treated paper, textile, and non-porous substrates including polymeric films such as polyvinyl choride and polyester.

Method of Printing

In applying the inventive inks, one ink can be jetted onto a substrate first, followed by the other, with some delay (seconds) in between, or the inks could be applied virtually simultaneously. The sequence and timing will depend on the needs of the application. For example, on a porous substrate, there might be benefits to putting the pCDI ink down first, especially when the PCDI ink is cationic ionic or contains multivalent cations, followed by the co-reactive colored ink to limit the latter's penetration into the substrate. This could limit bleed and provide a chroma boost as well as a more durable crosslinked layer. On an impermeable substrate, the co-reactive color might go down first followed by the pCDI ink to provide maximum durability on the top of the printed layer. If the two inks are jetted virtually simultaneously, then the mixing of the two inks would be maximized and the whole layer would have more uniform crosslinking.

Preferred Embodiments

Without limiting the scope of the present invention, the following are specific preferred embodiments:
1. An inkjet ink set comprising at least a first and second ink wherein said first ink comprises a first vehicle and a pCDI species, and said second ink comprises a second vehicle and a co-reactive species containing one or more moieties reactive with the pCDI species. Either one or both of the first and second inks can contain colorant and either one or both of the first and second vehicles can be aqueous vehicle.
2. An inkjet ink set comprising at least a first and second ink wherein said first ink comprises a first vehicle and a pCDI species, and said second ink comprises a second vehicle and a co-reactive species, wherein the co-reactive species is soluble in the second vehicle. Preferably the co-reactive species comprises a plurality of moieties reactive with the pCDI species, and the pCDI reactive moieties are selected from carboxyl, amine, thiol and betadiketone groups, and combinations thereof. And, preferably, the second vehicle is aqueous vehicle. Either one or both of the first and second inks can contain colorant.
3. An inkjet ink set comprising at least a first and second ink wherein said first ink comprises a first vehicle and a pCDI species, and said second ink comprises a second vehicle and a co-reactive species, wherein the second vehicle is an aqueous vehicle and the co-reactive species is a polymer (latex) dispersed in the second vehicle. Preferably the latex co-reactive species is ionically stabilized to dispersion. More preferably the latex is stabilized with anionic carboxylate moieties that are able to co-react with pCDI species. The latex polymers are preferably selected from (styrene)acrylic and polyurethane polymers. Either one or both of the first and second inks can contain colorant
4. An inkjet ink set comprising at least a first and second ink wherein said first ink comprises a first vehicle and pCDI species, and said second ink comprises a second vehicle, a pigment colorant dispersed therein and a co-reactive species containing one or more moieties reactive with the pCDI species. The second vehicle is preferably an aqueous vehicle and the pigment colorant is preferably anionically stabilized, most preferably with anionic carboxyl moieties. The preferred pigment dispersions include, for example, pigment dispersed with acrylic polymer comprised of carboxylate groups, and SDP where the attached hydrophilic groups are comprised of carboxylates. When the anionic stability imparting groups on the pigment are moieties such as carboxyl, these can also serve, entirely or in part, as the co-reactive species with the pCDI species. The pCDI species can be a cationic pCDI species to enhance interaction with an anionic co-reactive species such as a carboxylate-containing co-reactive species.
5. An inkjet ink set comprising at least a first and second ink wherein said first ink comprises a first vehicle and pCDI species, and said second ink comprises a second vehicle, a soluble colorant and a co-reactive species containing one or more moieties reactive with the pCDI species. The second vehicle is preferably an aqueous vehicle and the soluble colorant (dye) is preferably anionic. When the dye is comprised of pCDI reactive moieties, such as anionic carboxyl moieties, these can also serve, entirely or in part, as the co-reactive species with the pCDI species. The pCDI species can be a cationic pCDI species to enhance interaction with an anionic co-reactive species.
6. An inkjet ink set comprising at least a first and second ink wherein said first ink comprises a first vehicle, a pigment colorant and a pCDI species, and said second ink comprises a second vehicle and a co-reactive species containing one or more moieties reactive with the pCDI species. The pigment colorant is preferably cationically stabilized. The preferred pigment dispersions include, for example, pigment dispersed with cationic polymer and SDP where the attached hydrophilic groups are comprised of cationic groups. The second ink can further comprise anionic latex polymer.
7. In another embodiment, there is provided an ink set comprising a first ink comprising a first vehicle and a pCDI species (with no colorant); a second ink comprising a magenta colorant, co-reactive species and second vehicle; a third ink comprising a yellow colorant, co-reactive species and third vehicle; and a fourth ink comprising a cyan colorant, co-reactive species and a fourth vehicle. Preferably the magenta, yellow and cyan colorant are pigments. Optionally, there is a fifth ink comprising a black colorant, co-reactive species and a fifth vehicle. The vehicle, in all cases, can be aqueous vehicle.

EXAMPLES

Commercial ingredients used in the examples include: Dowanol® PMA, propylene glycol methyl ether acetate (Dow); Ucarlinx® XL-29SE (50% solids), a solvent-borne polycarbodiimide (Union Carbide); Carbodelite® V-02-L2 (40% solids), a water-soluble polycarbodiimide (Nisshinbo Industries); Carbodelite® E-02 (40% solids), a water-dispersible polycarbodiimide (Nisshinbo Industries); BYK® 348 a surfactant, (Byk Chemie); and Witcobond® W213 a waterborne cationic polyurethane dispersion (Uniroyal Chemical Company).

First Ink (Inks 1A-1E Containing pCDI)

Five colorless pCDI containing inks were prepared by mixing ingredients together according to the following formulations.

| | Percent Weight of Total Ink | | | | |
|---|---|---|---|---|---|
| Ingredients | Ink 1A | Ink 1B | Ink 1C | Ink 1D | Ink 1E |
| Ucarlinx ® XL-29SE (% polymer solids) | | | 5 | | |
| Carbodelite ® V-02-L2 (% polymer solids) | 5 | | | | |
| Carbodelite ® E-02 (% polymer solids) | | 5 | | 10 | |
| Witcobond ® W213 (% polymer solids) | | | | | 7.5 |
| Glycerol | 9 | 9 | | 9 | 9 |
| Ethylene Glycol | 6 | 6 | | 6 | 6 |
| 1,2-hexanediol | 5 | 5 | | 5 | 5 |
| Dowanol ® PMA | | | 90 | | |
| BYK ® 348 | 0.1 | 0.1 | | 0.1 | 0.1 |
| Water | balance | balance | — | balance | balance |
| PH | 8.49 | 9.46 | 7.1 | 9.61 | 9.1 |
| Viscosity cps @ 25° C. | 2.42 | 2.26 | 1.72 | 2.84 | 5.2 |

Second Ink (Co-Reactive Inks 2A-2D)

Two co-reactive inks with black pigment were prepared according to the following formulations. The vehicle components were mixed together first and then the dispersion was added slowly with thorough stirring. The co-reactive groups are the carboxyls associated with the pigment and in the case of 2D, the carboxyls in the acrylic latex. The pH was in the range of 7-8.

|  | Percent Weight of Total Ink | | | |
|---|---|---|---|---|
| Ingredients | Ink 2A | Ink 2B | Ink 2C | Ink 2D |
| Dispersion 1 (as % pigment) | 2.8 | | | |
| Dispersion 2 (as % pigment) | | 4.50 | | |
| Dispersion 3 (as % pigment) | | | 4.5 | 4.5 |
| Acrylic Latex | | | | 3 |
| Glycerol | 9 | 9 | 9 | 9 |
| Ethylene glycol | 6 | 6 | 6 | 6 |
| 1,2 hexanediol | 5 | 5 | 5 | 5 |
| BYK ® 348 | 0.10 | 0.10 | 0.10 | 0.10 |
| Water | balance | balance | balance | balance |

Dispersion 1 was a polymer stabilized carbon black pigment dispersion prepared in a manner similar to example 3 in U.S. Pat. No. 5,519,085 (the disclosure of which is incorporated by reference herein for all purposes as if fully set forth) except that the dispersant was a block copolymer with methacrylic acid//benzyl methacrylate//ethyltriethyleneglycol methacrylate (13//15//4). The neutralizing agent for the dispersant was potassium hydroxide and the pH was maintained in the range of 7-8. The pigment content of the final dispersion was adjusted by water addition to be 15% by weight. The dispersant had a number average molecular weight of about 5,000 and weight average molecular weight of about 6,000 g/mol, and was prepared in a manner similar to "preparation 4" described in previously incorporated U.S. Pat. No. 5,519,085, except the monomer levels were adjusted to give the ratio indicated.

Dispersion 2 was a polymer stabilized dispersion of carbon black pigment prepared by milling 3 parts by weight (PBW) pigment with 1 part graft copolymer dispersant in water. The graft copolymer dispersant was phenoxyethyl acrylate-g-ethoxy-triethyleneglycol methacrylate-co-methacrylic acid, 66/4/30. The neutralizing agent for the dispersant was N,N-dimethylethanolamine and the pH was maintained in the range of 7-8. The pigment content in the final dispersion was adjusted with water to be 15% by weight.

Dispersion 3 was Cab-O-Jet® 300 used as received from the vendor, Cabot Corporation (aqueous dispersion with 15.5% self-dispersed carbon black pigment). The surface is modified with grafted carboxylate groups.

Acrylic latex was the same as the "dispersed binder" described in WO03/029007 (the disclosure of which is incorporated by reference herein for all purposes as if fully set forth) and contained 36.1% polymer solids in aqueous dispersion.

Print Test

The black pen of two Epson 3000 printers operating in the 1440 dpi mode was used to print test patterns ½ inch wide and 6 inches long onto Gilbert bond paper. The first ink loaded into a cleaned pen of one printer and the second ink was loaded into a cleaned black pen of the other printer. The test page was printed first with one printer (first pass), then immediately fed into the other printer (second pass) and overprinted with the other ink. The time between each pass was no more than about 15 seconds. Inks used in each trial are summarized in the following table.

| Trial | First Pass | Second pass |
|---|---|---|
| 1 | Ink 2A | None |
| 2 | Ink 2A | Ink 1A |
| 3 | Ink 1A | Ink 2A |
| 4 | Ink 2A | Ink 1B |
| 5 | Ink 1B | Ink 2A |
| 6 | Ink 2A | Ink 1C |
| 7 | Ink 1C | Ink 2A |
| 8 | Ink 2B | None |
| 9 | Ink 2B | Ink 1A |
| 10 | Ink 1A | Ink 2B |
| 11 | Ink 2B | Ink 1B |
| 12 | Ink 1B | Ink 2B |
| 13 | Ink 2B | Ink 1C |
| 14 | Ink 1C | Ink 2B |
| 15 | Ink 2C | None |
| 16 | Ink 1C | Ink 1A |
| 17 | Ink 1A | Ink 2C |
| 18 | Ink 2C | Ink 1B |
| 19 | Ink 1B | Ink 2C |
| 20 | Ink 2C | Ink 1E |
| 21 | Ink 1E | Ink 2C |
| 22 | Ink 2D | None |
| 23 | Ink 2D | Ink 1D |
| 24 | Ink 1D | Ink 2D |
| 25 | Ink 2D | Ink 1E |
| 26 | Ink 1E | Ink 2D |

Trials 1, 8, 15 and 22 were comparative tests with colored ink and no other under/overcoat.

The test strip from each trial was cut into four equal parts and treated immediately after printing as follows:
  (a) Air dry at ambient temperature.
  (b) Oven dry at 120° C. for 10 minutes.
  (c) Pass under a focused radiant heater at 8 feet per minute, whereupon the temperature of the printed area reaches about 250° C.
  (d) Second pass under the focused radiant heater at 8 feet per minute.

The type of post treatment for each strip is indicated by an "(a)", "(b)", "(c)", or "(d)" after the trial number.

Each strip was given a double strike with a basic hi-liter (Avery #240XX) and an acid hi-liter (Avery #0774X) at 10 minutes after printing and 24 hours after printing, and visually evaluated for smear according to the following scale:
  5) very heavily smeared
  4) heavily smeared
  3) some smearing
  2) slightly smeared
  1) very slightly smeared
  0) no smear Improved fastness (reduced smear or bleed) is an indication that cross-linking occurred.

|  | Acid HiLiter Smear Rating | | Alkalai HiLiter Smear Rating | |
|---|---|---|---|---|
| Trial | 10 min | 24 hrs | 10 min | 24 hrs |
| 1(a) | 4 | 3 | 4 | 3 |
| 1(b) | 3 | 3 | 4 | 3 |
| 1(c) | 3 | 3 | 4 | 3 |
| 1(d) | 3 | 2 | 4 | 3 |
| 2(a) | 3 | 2 | 3 | 3 |
| 2(b) | 2 | 1 | 3 | 2 |
| 2(c) | 2 | 1 | 3 | 2 |
| 2(d) | 1 | 1 | 3 | 1 |

-continued

| | Acid HiLiter Smear Rating | | Alkalai HiLiter Smear Rating | |
|---|---|---|---|---|
| Trial | 10 min | 24 hrs | 10 min | 24 hrs |
| 3(a) | 3 | 2 | 3 | 3 |
| 3(b) | 1 | 1 | 2 | 2 |
| 3(c) | 1 | 1 | 3 | 3 |
| 3(d) | 1 | 1 | 1 | 1 |
| 4(a) | 2 | 1 | 3 | 2 |
| 4(b) | 1 | 0 | 2 | 1 |
| 4(c) | 1 | 0 | 2 | 1 |
| 4(d) | 0 | 0 | 1 | 1 |
| 5(a) | 3 | 1 | 4 | 2 |
| 5(b) | 1 | 0 | 2 | 1 |
| 5(c) | 1 | 1 | 2 | 1 |
| 5(d) | 0 | 1 | 1 | 1 |
| 6(a) | 3 | 1 | 4 | 2 |
| 6(b) | 2 | 1 | 3 | 2 |
| 6(c) | 2 | 2 | 4 | 2 |
| 6(d) | 2 | 2 | 4 | 2 |
| 7(a) | 3 | 2 | 4 | 3 |
| 7(b) | 2 | 2 | 3 | 2 |
| 7(c) | 2 | 2 | 3 | 2 |
| 7(d) | 2 | 1 | 3 | 2 |
| 8(a) | 4 | 3 | 4 | 3 |
| 8(b) | 3 | 3 | 4 | 3 |
| 8(c) | 3 | 3 | 4 | 3 |
| 8(d) | 3 | 2 | 4 | 3 |
| 9(a) | 2 | 3 | 4 | 3 |
| 9(b) | 2 | 1 | 3 | 2 |
| 9(c) | 2 | 1 | 3 | 1 |
| 9(d) | 1 | 0 | 3 | 1 |
| 10(a) | 2 | 1 | 4 | 2 |
| 10(b) | 1 | 0 | 2 | 1 |
| 10(c) | 1 | 1 | 2 | 1 |
| 10(d) | 0 | 0 | 1 | 0 |
| 11(a) | 2 | 0 | 3 | 1 |
| 11(b) | 0 | 0 | 1 | 0 |
| 11(c) | 0 | 0 | 1 | 1 |
| 11(d) | 0 | 0 | 1 | 0 |
| 12(a) | 3 | 1 | 4 | 2 |
| 12(b) | 0 | 0 | 2 | 0 |
| 12(c) | 1 | 0 | 3 | 1 |
| 12(d) | 1 | 0 | 2 | 1 |
| 13(a) | 3 | 1 | 4 | 2 |
| 13(b) | 2 | 1 | 3 | 2 |
| 13(c) | 2 | 2 | 4 | 2 |
| 13(d) | 2 | 2 | 4 | 2 |
| 14(a) | 3 | 2 | 4 | 3 |
| 14(b) | 2 | 2 | 3 | 2 |
| 14(c) | 2 | 2 | 3 | 2 |
| 14(d) | 2 | 1 | 3 | 2 |
| 15(a) | 5 | 5 | 5 | 5 |
| 15(b) | 5 | 5 | 5 | 5 |
| 15(c) | 5 | 5 | 5 | 5 |
| 15(d) | 4 | 4 | 5 | 5 |
| 16(a) | 5 | 3 | 5 | 4 |
| 16(b) | 3 | 2 | 4 | 3 |
| 16(c) | 2 | 1 | 3 | 2 |
| 16(d) | 2 | 1 | 3 | 2 |
| 17(a) | 5 | 3 | 5 | 4 |
| 17(b) | 3 | 3 | 4 | 4 |
| 17(c) | 3 | 2 | 4 | 4 |
| 17(d) | 2 | 1 | 3 | 3 |
| 18(a) | 5 | 3 | 5 | 4 |
| 18(b) | 3 | 2 | 3 | 2 |
| 18(c) | 2 | 1 | 2 | 2 |
| 18(d) | 1 | 1 | 2 | 2 |
| 19(a) | 5 | 5 | 5 | 5 |
| 19(b) | 3 | 3 | 4 | 4 |
| 19(c) | 3 | 3 | 4 | 4 |
| 19(d) | 3 | 1 | 3 | 2 |
| 20(a) | 1 | 0 | 1 | 0 |
| 20(b) | 1 | 0 | 0 | 0 |
| 20(c) | 0 | 0 | 0 | 0 |
| 20(d) | 0 | 0 | 0 | 0 |
| 21(a) | 5 | 3 | 5 | 3 |
| 21(b) | 1 | 1 | 2 | 1 |
| 21(c) | 1 | 1 | 3 | 2 |
| 21(d) | 1 | 0 | 2 | 0 |
| 22(a) | 3 | 3 | 3 | 3 |
| 22(b) | 2 | 2 | 3 | 3 |
| 22(c) | 2 | 2 | 3 | 2 |
| 22(d) | 2 | 1 | 3 | 1 |
| 23(a) | 1 | 0 | 2 | 0 |
| 23(b) | 0 | 0 | 1 | 0 |
| 23(c) | 0 | 0 | 1 | 0 |
| 23(d) | 0 | 0 | 0 | 0 |
| 24(a) | 1 | 0 | 2 | 0 |
| 24(b) | 0 | 0 | 0 | 0 |
| 24(c) | 0 | 0 | 0 | 0 |
| 24(d) | 0 | 0 | 0 | 0 |
| 25(a) | 0 | 0 | 0 | 0 |
| 25(b) | 0 | 0 | 0 | 0 |
| 25(c) | 0 | 0 | 0 | 0 |
| 25(d) | 0 | 0 | 0 | 0 |
| 26(a) | 3 | 0 | 3 | 0 |
| 26(b) | 0 | 0 | 0 | 0 |
| 26(c) | 0 | 0 | 0 | 0 |
| 26(d) | 0 | 0 | 0 | 0 |

When Ink 2A is printed alone on Gilbert bond paper, there was heavy smear immediately after printing; even after heating and standing 24 hours, the ink still smeared substantially. The under and overprinting of Ink 2A with Ink 1A resulted in a significant reduction of smear, especially if the printed area was subjected to heat. Ink 1B was even more effective at reducing smear. Under these conditions, solvent based Ink 1C was less effective than the aqueous analogs.

The results from Ink 2B show a similar trend, with Ink 1B being the most effective co-reactive combination. With this combination (trials 11 and 12), smear was substantially reduced or eliminated at room temperature on standing overnight or immediately with application of heat.

Ink 2C, made with SDP dispersion, showed worse smear (trial 15) than Inks 2A and 2B made with conventional pigment dispersions. Fixing Ink 2C with inks 1A and 1B reduced the amount of smear (trials 16 and 17), especially after the application of heat. Ink 1E, which contained a quarternary polymer in addition to the pCDI, gave even better smear resistance (trials 20 and 21).

Ink 2D, which contained Cab-O-Jet pigment dispersion and an acrylic latex showed less smear than Ink 2C (trial 22). Fixing this ink with inks 1D or 1E (trials 23-26) often resulted in the elimination of smear. Particularly advantageous was trial 25 where no smear was observed within 10 minutes of the printing and only air drying.

Four dye-based inks were prepared according to the formulas in the table below.

| | Percent Weight of the Total Ink | | | |
|---|---|---|---|---|
| Ingredients | Ink 3A | Ink 3B | Ink 3C | Ink 3D |
| Acid Black 194 | 3.5% | 3.5% | | |
| Direct Blue 199 | | | 2% | 2% |
| Glycerol | 9% | 9% | 9% | 9% |
| Ethylene Glycol | 6% | 6% | 6% | 6% |

-continued

| Ingredients | Percent Weight of the Total Ink | | | |
|---|---|---|---|---|
| | Ink 3A | Ink 3B | Ink 3C | Ink 3D |
| 1,2-Hexanediol | 5% | 5% | 5% | 5% |
| BYK 348 | 0.1% | 0.1% | 0.1% | 0.1% |
| Acrylic latex | | 6% | | 6% |
| Water | balance | balance | balance | balance |
| Viscosity (30 rpm@25° C.), CPS | 2.9 | 3.8 | 1.9 | |
| PH | 6.8 | 7.8 | 7.3 | |

| Trial | First Pass | Second pass |
|---|---|---|
| 27 | Ink 3A | None |
| 28 | Ink 3A | Ink 1D |
| 29 | Ink 1D | Ink 3A |
| 30 | Ink 3A | Ink 1E |
| 31 | Ink 1E | Ink 3A |
| 32 | Ink 3B | None |
| 33 | Ink 3B | Ink 1D |
| 34 | Ink 1D | Ink 3B |
| 35 | Ink 3B | Ink 1E |
| 36 | Ink 1E | Ink 3B |
| 37 | Ink 3C | None |
| 38 | Ink 3D | None |
| 39 | Ink 3C | Ink 1D |
| 40 | Ink 1D | Ink 3C |
| 41 | Ink 3D | Ink 1D |
| 42 | Ink 1D | Ink 3D |

The prints were again tested for smear, as before. In addition, the water fastness of the samples was also tested at 10 minutes and 24 hours by running several drops of deionized water over the printed area while the page was held at a 45° angle. The degree of bleed of the color onto the white margin was visually rated according to the scale below. Inks are preferably water fast and therefore preferably show little or no bleed. The pigmented inks described previously were generally water fast and not individually tested. Dye inks are typically less water fast.

Waterfastness rating:
5—very severe bleed
4—severe bleed
3—some bleed
2—slight bleed
1—very slight bleed
0—no bleed

| | Acid HiLiter Smear Rating | | Alkalai HiLiter Smear Rating | | Water fastness Rating | |
|---|---|---|---|---|---|---|
| Trial | 10 min | 24 hrs | 10 min | 24 hrs | 10 min | 24 hrs |
| 27(a) | 4 | 3 | 3 | 2 | 5 | 5 |
| 27(b) | 3 | 3 | 2 | 2 | 5 | 5 |
| 27(c) | 3 | 3 | 3 | 3 | 5 | 5 |
| 27(d) | 3 | 3 | 3 | 3 | 5 | 5 |
| 28(a) | 2 | 2 | 2 | 1 | 1 | 0 |
| 28(b) | 1 | 0 | 0 | 0 | 0 | 0 |
| 28(c) | 1 | 0 | 1 | 0 | 0 | 0 |
| 28(d) | 0 | 0 | 0 | 0 | 0 | 0 |
| 29(a) | 3 | 2 | 3 | 1 | 0 | 0 |
| 29(b) | 1 | 0 | 1 | 0 | 1 | 0 |
| 29(c) | 2 | 0 | 2 | 0 | 1 | 1 |
| 29(d) | 1 | 0 | 1 | 0 | 1 | 0 |
| 30(a) | 0 | 0 | 0 | 0 | 0 | 0 |
| 30(b) | 0 | 0 | 0 | 0 | 0 | 0 |
| 30(c) | 0 | 0 | 0 | 0 | 0 | 0 |
| 30(d) | 0 | 0 | 0 | 0 | 0 | 0 |
| 31(a) | 2 | 0 | 2 | 0 | 1 | 1 |
| 31(b) | 0 | 0 | 1 | 0 | 1 | 1 |
| 31(c) | 0 | 0 | 0 | 0 | 1 | 1 |
| 31(d) | 0 | 0 | 1 | 0 | 0 | 0 |
| 32(a) | 4 | 4 | 3 | 3 | 5 | 5 |
| 32(b) | 3 | 3 | 3 | 3 | 5 | 5 |
| 32(c) | 4 | 4 | 3 | 3 | 5 | 5 |
| 32(d) | 3 | 3 | 3 | 3 | 5 | 5 |
| 33(a) | 0 | 0 | 0 | 0 | 0 | 0 |
| 33(b) | 0 | 0 | 0 | 0 | 1 | 0 |
| 33(c) | 0 | 0 | 0 | 0 | 0 | 0 |
| 33(d) | 0 | 0 | 0 | 0 | 0 | 0 |
| 34(a) | 2 | 0 | 1 | 0 | 0 | 0 |
| 34(b) | 1 | 0 | 0 | 0 | 1 | 0 |
| 34(c) | 1 | 0 | 0 | 0 | 1 | 2 |
| 34(d) | 0 | 0 | 0 | 0 | 0 | 1 |
| 35(a) | 0 | 0 | 0 | 0 | 0 | 0 |
| 35(b) | 0 | 0 | 0 | 0 | 0 | 0 |
| 35(c) | 0 | 0 | 0 | 0 | 0 | 0 |
| 35(d) | 0 | 0 | 0 | 0 | 0 | 0 |
| 36(a) | 1 | 1 | 0 | 0 | 1 | 1 |
| 36(b) | 0 | 0 | 0 | 0 | 0 | 0 |
| 36(c) | 0 | 0 | 0 | 0 | 0 | 0 |
| 36(d) | 0 | 0 | 0 | 0 | 0 | 0 |

| | Water Fastness Rating | |
|---|---|---|
| Trial | 10 min | 24 hrs |
| 37(a) | 5 | 5 |
| 37(b) | 5 | 5 |
| 37(c) | 5 | 5 |
| 37(d) | 5 | 5 |
| 38(a) | 5 | 5 |
| 38(b) | 5 | 5 |
| 38(c) | 5 | 5 |
| 38(d) | 5 | 5 |
| 39(a) | 3 | 3 |
| 39(b) | 2 | 2 |
| 39(c) | 2 | 2 |
| 39(d) | 2 | 2 |
| 40(a) | 3 | 3 |
| 40(b) | 3 | 3 |
| 40(c) | 3 | 3 |
| 40(d) | 3 | 2 |
| 41(a) | 2 | 2 |
| 41(b) | 1 | 1 |
| 41(c) | 1 | 2 |
| 41(d) | 1 | 1 |
| 42(a) | 2 | 2 |
| 42(b) | 2 | 2 |
| 42(c) | 2 | 2 |
| 42(d) | 2 | 2 |

After printing and drying, the smear fastness and the water fastness were poor for Ink 3A and 3B, as shown by Trials 27 and 32. The application of heat provided a marginal improvement. The addition of the acrylic latex to Ink 3B made no improvement in the fastness properties (Trials 27 and 32). Trials 28 and 29, and 33 and 34, demonstrate that printing Ink 1D over or under both Inks 3A and 3B caused a substantial improvement in both the smear and the water fastness, allowing the printed area to be very fast with just air drying. Printing Ink 1E (containing both a polycarbodiimide and a quaternary polymer) over either of Inks 3A or 3B (Trials 30 and 35)

allowed them to be smear fast and water fast within 10 minutes after printing, at room temperature. Improved fastness was also obtained for the other dye-containing inks 3C and 3D.

The examples demonstrate advantageous improvement in fastness by employing the inks prescribed by the present invention.

What is claimed is:

1. An inkjet ink set comprising at least two inkjet inks, wherein:
   (a) at least one of the inkjet inks is a first inkjet ink comprising a first vehicle and a carbodiimide groups-containing component dispersed and/or dissolved in the first vehicle, wherein the carbodiimide groups-containing component comprises monomer, oligomer or polymer molecules, or mixtures of one or more thereof, possessing on average at least two carbodiimide groups per molecule; and
   (b) at least one other inkjet ink is a second inkjet ink comprising a second vehicle and a co-reactive species dispersed and/or dissolved in the second vehicle, the co-reactive species comprising one or more moieties reactive with carbodiimide groups.

2. The ink set of claim 1, wherein the second inkjet ink further comprises a colorant.

3. The ink set of claim 1, wherein the first ink does not contain a colorant.

4. The ink set of claim 1, comprising at least three differently colored inkjet inks, wherein:
   at least one of the differently colored inkjet inks is the second inkjet ink;
   at least one of the differently colored inkjet inks is a third inkjet ink comprising a third vehicle having dispersed and/or dissolved therein a colorant and a co-reactive species comprising one or more moieties reactive with carbodiimide groups; and
   at least one of the differently colored inkjet inks is a fourth inkjet ink comprising a fourth vehicle having dispersed and/or dissolved therein a colorant and a co-reactive species comprising one or more moieties reactive with carbodlimide groups.

5. A method for ink jet printing onto a substrate, comprising the steps of:
   (a) providing an ink jet printer that is responsive to digital data signals;
   (b) loading the printer with a substrate to be printed;
   (c) loading the printer with an inkjet ink set as set forth in claim 1, and;
   (d) printing onto the substrate using inkjet ink set in response to the digital data signals.

6. The method of claim 5, wherein the substrate is plain paper.

7. The method of claim 5, wherein the substrate is a textile.

* * * * *